United States Patent
Schunk et al.

(10) Patent No.: US 6,812,612 B2
(45) Date of Patent: Nov. 2, 2004

(54) STATOR FOR A SYNCHRONOUS MACHINE

(75) Inventors: Holger Schunk, Lendershausen (DE); Rolf Vollmer, Gersfeld (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/639,250

(22) Filed: Aug. 12, 2003

(65) Prior Publication Data

US 2004/0084989 A1 May 6, 2004

(30) Foreign Application Priority Data

Aug. 12, 2002 (DE) .......................................... 102 36 941

(51) Int. Cl.[7] .............................................. H02K 1/28
(52) U.S. Cl. ........................................ 310/218; 310/259
(58) Field of Search ................................ 310/216–218, 310/254, 258, 259

(56) References Cited

U.S. PATENT DOCUMENTS

| | | | | |
|---|---|---|---|---|
| 2,371,268 A | * | 3/1945 | Scofield | 310/254 |
| 3,328,617 A | * | 6/1967 | Kenneth | 310/180 |
| 3,441,760 A | * | 4/1969 | Collens | 310/91 |
| 3,521,100 A | * | 7/1970 | Tamm | 310/186 |
| 3,859,549 A | * | 1/1975 | Boesel | 310/218 |
| 4,041,338 A | * | 8/1977 | Madsen et al. | 310/186 |
| 5,422,530 A | * | 6/1995 | Nolle | 310/257 |
| 6,127,760 A | * | 10/2000 | Nagasaki et al. | 310/254 |
| 6,369,483 B1 | * | 4/2002 | Hill | 310/216 |
| 6,452,303 B1 | * | 9/2002 | Marioni | 310/254 |
| 6,486,583 B2 | * | 11/2002 | van Heyden et al. | 310/218 |

FOREIGN PATENT DOCUMENTS

DE 198 05 981 A1 8/1999

\* cited by examiner

*Primary Examiner*—Dang Le
(74) *Attorney, Agent, or Firm*—Henry M. Feiereisen

(57) ABSTRACT

A harmonic motor with an increased slot surface and copper fill factor is described. A laminated stator core for an electric machine, in particular for a synchronous machine, has a substantially cylindrical bore and a plurality of pole teeth extending radially inwardly in the bore. Each of the pole teeth have an inner free end, with a fixed tooth head affixed to the inner end of each second pole tooth, as viewed in the circumferential direction. A pole tooth with a removable head is arranged between each two pool teeth with a fixed tooth head. For easy installation, windings can only be wound around those pole teeth that have a removable tooth head.

9 Claims, 3 Drawing Sheets

STATOR FOR A SYNCHRONOUS MACHINE

CROSS-REFERENCES TO RELATED APPLICATIONS

This application claims the priority of German Patent Application, Serial No. 102 36 941.0, filed Aug. 12, 2002, pursuant to 35 U.S.C. 119(a)–(d), the disclosure of which is incorporated herein by reference.

BACKGROUND OF THE INVENTION

The invention is directed to a laminated stator core for an electric machine, in particular to a laminated stator core for a synchronous harmonic machine.

Stators of so-called harmonic motors have to satisfy specific requirements. Harmonic motors are motors where the number of rotor poles corresponds to an integer multiple, e.g., 2, 3, 4, . . . of the fundamental number of stator poles. The stator teeth of such harmonic motors should have high and wide tooth heads, and the stator slots should have a high copper fill factor.

Laminated stator cores with slots between the tooth heads that are manufactured by inserting the respective stator winding into the slots are known in the art. However, a high copper fill factor cannot be achieved by using this technique.

A laminated stator core of this type is known from DE 198 05 981. It consists of a radially arranged yoke packet with inwardly oriented poles or conical teeth or necked teeth, respectively. When the stator is manufactured, a respective pole coil is wound around each necked tooth, and a tooth head is secured to the necked tooth with the winding. However, such stators can disadvantageously not be used with harmonic motors.

It would therefore be desirable and advantageous to provide an improved laminated stator core for a harmonic motor, which obviates prior art shortcomings, can be more easily manufactured and allows a higher copper slot fill factor.

SUMMARY OF THE INVENTION

According to one aspect of the invention, the object is solved by a laminated stator core for an electric machine, in particular for a synchronous harmonic machine, with an essentially cylindrical bore and a plurality of pole teeth extending radially inwardly in the bore. Each of the pole teeth have an inner free end, wherein the inner end of each second pole tooth has, as viewed in the circumferential direction, a fixed tooth head. A pole tooth with a removable head is arranged between each two pool teeth with a fixed tooth head, as viewed in the circumferential direction.

This approach, where only every second tooth is provided with both a winding and a tooth head, advantageously results not only in a high slot fill factor, but also in small air gaps at the joints and small areas with magnetic interference while simultaneously simplifying installation. Moreover, the stator can have a uniform height with a reduced stray flux.

Preferably, the stator core includes pole teeth in the circumferential direction with wider and narrower necks, wherein the tooth head on each wider necked teeth is removable. In this way, the windings can be easily applied on the wider necked teeth, wherein the narrower necked teeth are left without a winding.

It is advantageous for the installation to attach each removable tooth head on the corresponding necked tooth by a snap connection. One element of the snap connection is provided with a groove and the other element is provided with a complementary projection. When the two components are connected, the projection engages with the other groove. The walls of the groove are initially spread apart when the tooth head and necked tooth are joined, if the groove includes a recess and the complementary projection includes at its distal end a corresponding extension. When the tooth head and the necked tooth are finally pushed together, the walls of the groove snap together slightly, i.e., in the direction to the unstressed state. This produces a releasable snap connection.

Preferably, one of the components of the snap connection can include a locking element which in the installed state presses an elastic component of the snap connection into a locked position. In this way, in the walls of the tooth groove can be urged towards each other at the end of the snap-in motion, so that the protuberance at the distal end of the snap connection projection can no longer be easily pulled out of the recess located on the tooth groove.

The removable tooth heads are preferably laminated in the form of strips, which allows cost-effective fabrication of tooth heads that can be easily installed.

As mentioned above, that aforedescribed laminated stator core can be used to manufacture stators with windings arranged around the wide necked teeth. Such stators are particularly suited for harmonic motors.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
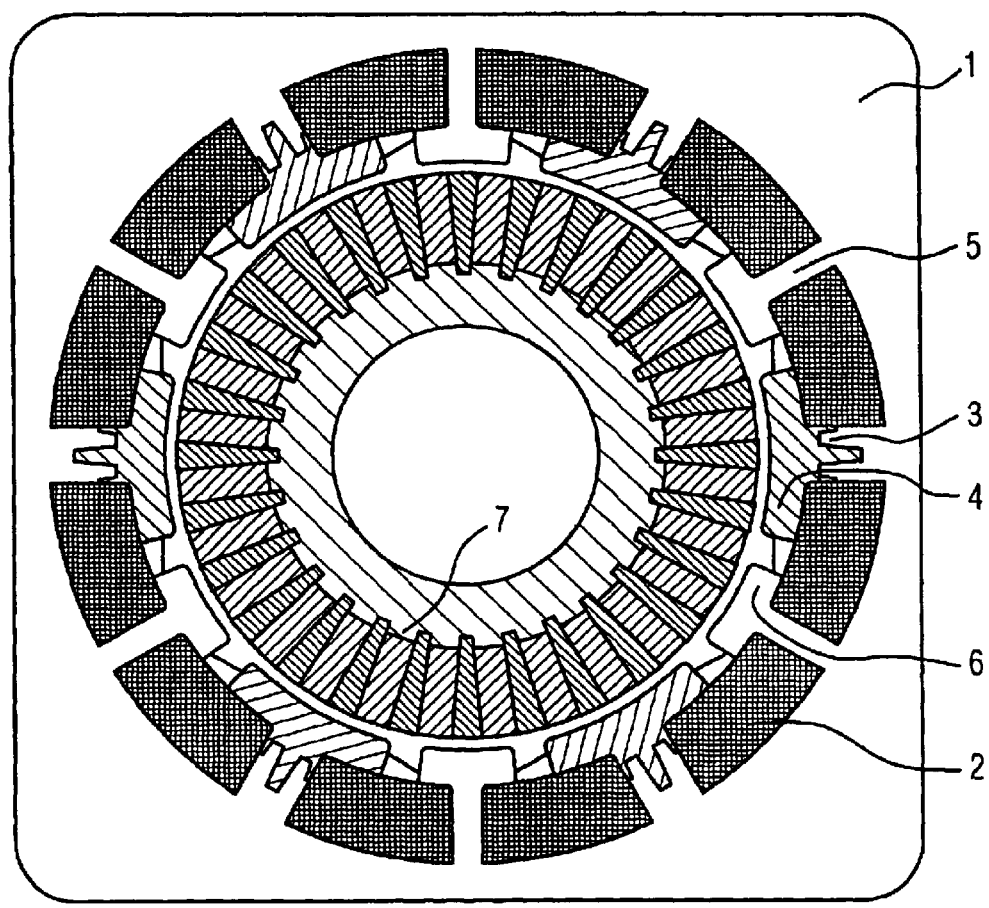
FIG. 1 is a cross-sectional view perpendicular to the rotation axis of a harmonic motor according to the invention.

Throughout all the Figures, same or corresponding elements are generally indicated by same reference numerals. Not all elements, for example the windings, are shown in all Figures. The depicted embodiments are to be understood as illustrative of the invention and not as limiting in any way.

Turning now to the drawing, and in particular to FIG. 1, there is shown a cross-sectional view of a harmonic motor according to the invention. A laminated stator core 1 is provided with slots, in which copper windings 2 are inserted. Wider pole teeth 3, 4 and narrower pole teeth 5, 6 extend alternatingly inwardly along circumferential direction between the slots that are filled with the copper windings 2. Each of the pole teeth consists of a necked tooth 3, 5 and a tooth heads 4, 6. The tooth head 6 of the narrower pole tooth is fixedly attached to the necked tooth 5. Conversely, the tooth head 4 of a wider pole tooth can be removed from its associated necked tooth 3. A rotor 3 is disposed inside the stator for rotation.

Figure 2:
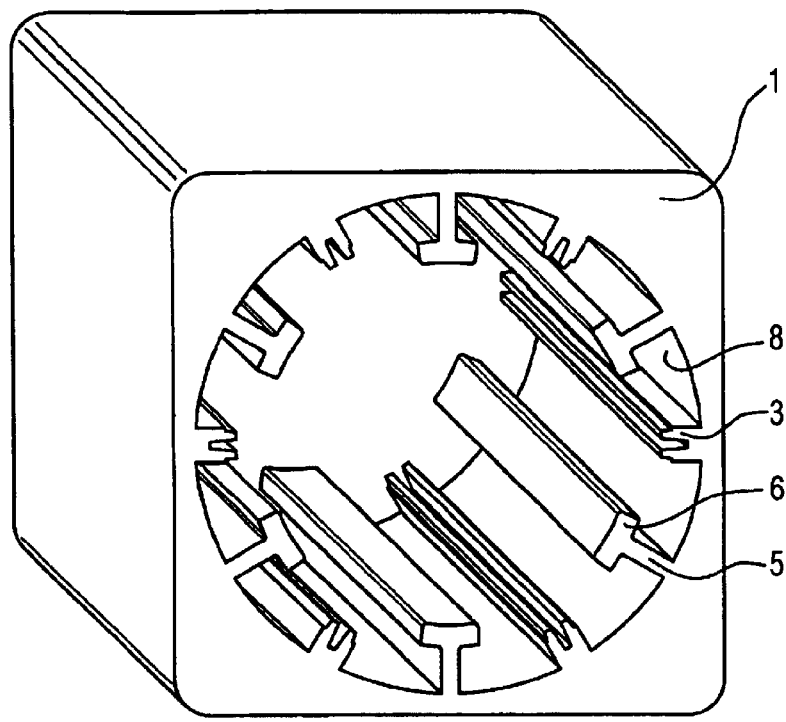
FIG. 2 is a perspective view of a laminated stator core according to the invention without tooth heads.

FIG. 2 shows a perspective view of the slotted laminated stator core 1, which is preferably made from stamped sheet metal. As mentioned above, wider teeth 3 and narrower teeth 5, 6 are arranged alternatingly between the slots. As seen clearly in FIG. 2, only the narrower teeth initially include a tooth head 6.

When the stator is installed, the windings are wound only around the wider teeth and teeth necks 3, respectively. The windings, which is not depicted in FIG. 2 for sake of clarity (it is shown, however, in FIG. 1), are pressed into the slots 8 between a respective narrower tooth 5, 6 and a wider necked tooth 3.

Figure 3:
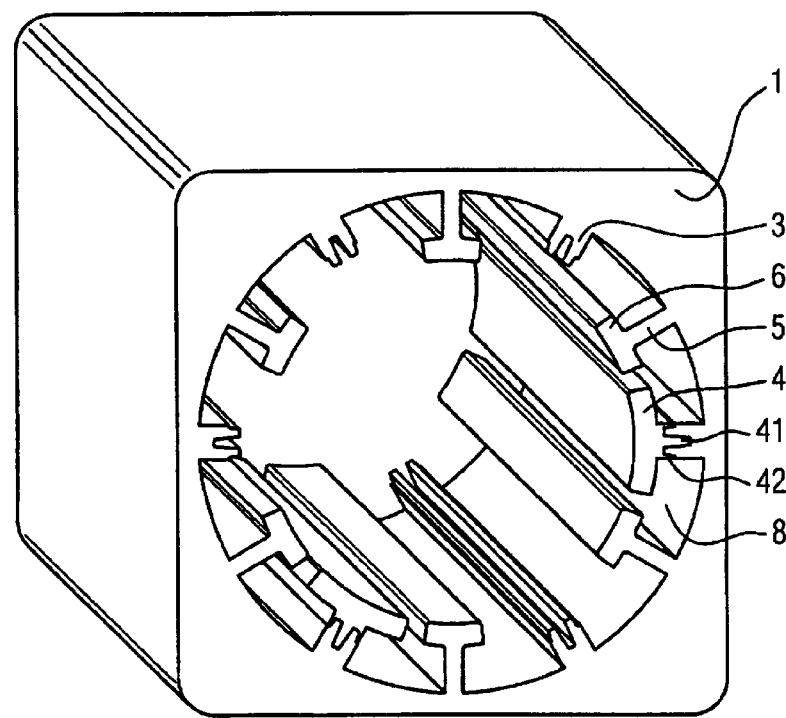
FIG. 3 is a perspective view of a laminated stator core with two installed removable tooth heads.

After all the windings have been placed in the slots 8, the tooth heads 4 are placed on the wider necked teeth 3, as shown in FIG. 3 (the windings are also not shown for sake of clarity). In this drawing, two tooth heads 4 are symbolically placed on the respective necked teeth 3. As seen clearly, the tooth heads 4 of the wider teeth are wider than the tooth heads 6 of the narrower teeth.

The removable tooth heads 4 can be secured to the necked teeth 3 using any conventional attachment technique. For example, a snap connection is particularly suited for easy installation. The wider necked tooth 3 and the wider tooth head 4 have corresponding profiles suitable for the snap connection. This is indicated in FIG. 3 by a projection 41 on the tooth head and a locking element 42.

Figure 4:
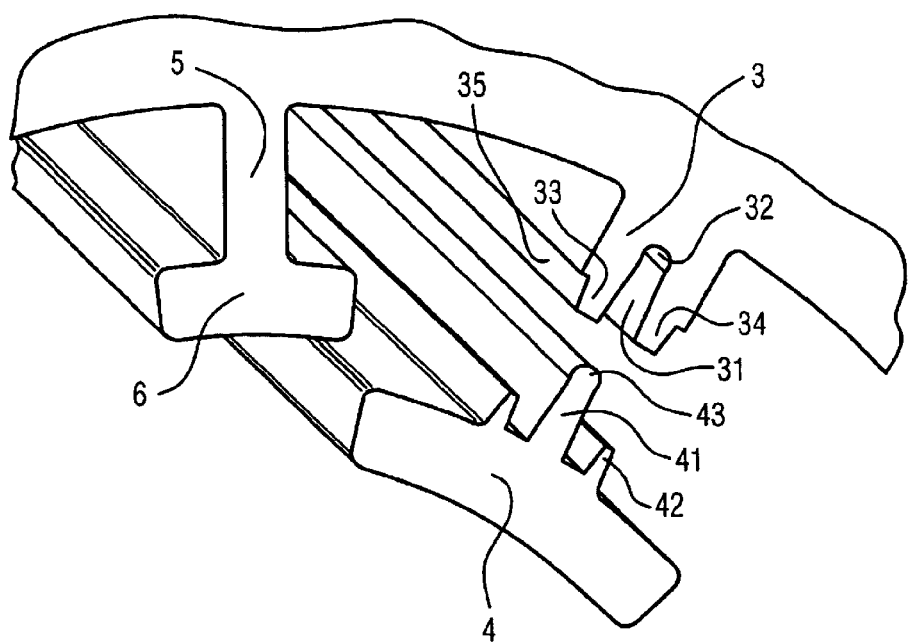
FIG. 4 is a perspective partial view showing the installation of a tooth head.

FIG. 4 shows on an enlarged scale in more detail the components of the snap connection. The wider necked tooth 3 includes a groove 31 which extends along the motor axis through the entire wide tooth. A recess 32 is located at the bottom of the groove 31. Walls 33 and 34 are formed on both sides of the groove. On their free ends, the walls 33 and 34 have outwardly oriented notches 35 that face away from the groove 31.

As a second snap connection element, the wider tooth head 4 includes corresponding complementary projections which formfittingly engage with the groove 31 and the notches 35. Accordingly, the tooth head 4 includes the tooth head projection 41 which also extends preferably over the entire length of the tooth head 4 and is effectively wedge-shaped. A protuberance 43 is formed on its tip. As viewed in the axial direction, wedge-shaped locking element 42 are also located to the left and to the right of the tooth head projection 41, which formfittingly engage with notches 35.

When installing the tooth head 4 on the necked tooth 3, initially the walls 33 and 34 are slightly spread apart by the protuberance 43. When the projection 41 is completely pushed into the groove 31, the protuberance 43 locks in the recess 32, causing the walls to again automatically move closer. The locking elements 42 which in their final position urge the walls 33 and 34 against the projection 41, aid the movement of the walls 33 and 34 towards each other. The tooth head 4 is thereby non-positively secured to prevent a radial inward movement.

The illustrated laminated stator core design, whereby a winding is placed on only every second pole tooth of the stator joke, and the specific technique used for joining the various elements or snapping them together, whereby a tooth head is placed on every second tooth, optimize the harmonic motor with respect to a large slot surface, a high copper fill factor and simplify installation.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. Laminated stator core for an electric machine, in particular for a synchronous harmonic machine, with an essentially cylindrical bore, the stator comprising a plurality of pole teeth extending radially inwardly in the bore and each having an inner free end, with every other of the plurality of pole teeth having on the inner free end thereof a fixed tooth head, as viewed in the circumferential direction of the bore;

a removable tooth head secured on the pole teeth located between the pole teeth having the fixed tooth heads, as viewed in the circumferential direction of the bore, and windings wound only around those pole teeth that have the removable tooth head.

2. The laminated stator core of claim 1, wherein the pole teeth include teeth having a wider neck and teeth having a narrower neck and the removable tooth head is secured to a tooth having the wider neck.

3. The laminated stator core of claim 1, wherein each removable tooth head is attachable on a corresponding pole tooth by a snap connection.

4. The laminated stator core of claim 3, wherein the snap connection comprises a first element with a groove and a second element with a projection complementary to the groove.

5. The laminated stator core of claim 4, wherein the groove comprises a recess and the complementary projection comprises an extension at a distal end of the projection.

6. The laminated stator core of claim 4, wherein the snap connection includes a locking element which in an installed state presses an elastic component of the snap connection into a locked position.

7. The laminated stator core of claim 1, wherein the removable tooth heads comprise laminated sheet metal stacks in the form of strips.

8. The laminated sister core according to claim 1, and further comprising windings disposed in slots formed between the pole teeth.

9. A harmonic motor comprising:

a stator having a laminated stator core with an essentially cylindrical bore and comprising a plurality of pole teeth extending radially inwardly in the bore, with each of the pole teeth having an inner free end;

a fixed tooth head affixed to the free inner end of each second pole tooth, as viewed in the circumferential direction of the bore;

a removable tooth head secured to those pole teeth that are located between two fixed tooth heads, as viewed in the circumferential direction of the bore;

a rotor rotatably disposed in the bore of the stator, and windings wound only around those pole teeth that have the removable tooth head.

\* \* \* \* \*